(12) United States Patent
Carlson

(10) Patent No.: US 6,688,490 B2
(45) Date of Patent: Feb. 10, 2004

(54) COFFEE FILTER EXTRACTOR AND INSERTER

(76) Inventor: Ronald B. Carlson, 508 E. Wabash Ave., Spokane, WA (US) 99207

(*) Notice: Subject to any disclaimer, the term of this patent is extended or adjusted under 35 U.S.C. 154(b) by 60 days.

(21) Appl. No.: 10/099,759

(22) Filed: Mar. 15, 2002

(65) Prior Publication Data
US 2003/0042270 A1 Mar. 6, 2003

Related U.S. Application Data

(60) Provisional application No. 60/316,055, filed on Aug. 31, 2001.

(51) Int. Cl.⁷ .............................................. B23Q 7/04
(52) U.S. Cl. ...................................................... 221/210
(58) Field of Search ......................................... 221/210

(56) References Cited

U.S. PATENT DOCUMENTS

| | | | |
|---|---|---|---|
| 4,957,217 A | * | 9/1990 | Ritson ..................... 221/210 X |
| 5,097,984 A | * | 3/1992 | Meisner et al. ......... 221/210 X |
| 6,273,293 B1 | | 8/2001 | Carlson |

* cited by examiner

Primary Examiner—David H. Bollinger

(57) ABSTRACT

A cover assembly for a container of coffee filters, with a tube, centrally located, extending below the cover. A plunger extending above and below the cover, slidably cooperating with the inner wall of the tube, the lower end terminated with an adhesive substance, the upper end terminated with a knob. When the plunger is depressed the adhesive attaches to the uppermost filter of a stack of nested filters and when the plunger is lifted up the filter is extracted from the nest of filters. The filter is then inserted into a coffee maker receptacle and the cover is pushed down to detach the filter from the adhesive tip on the plunger.

6 Claims, 1 Drawing Sheet

COFFEE FILTER EXTRACTOR AND INSERTER

CROSS REFERENCE TO RELATED APPLICATIONS

This application is entitled to the benefit of Provisional Patent Application Ser. No. 60/316,055 filed Aug. 31, 2001.

STATEMENT REGARDING FEDERALLY SPONSORED RESEARCH AND DEVELOPMENT

Not applicable.

BACKGROUND OF INVENTION

1. Field of the Invention

The present invention relates to a cup shaped coffee filter extractor and inserter.

2. Discussion of Relevant Art

The applicant is aware of several devices that extract a cup shaped coffee filter from a plurality of nested coffee filters but only one that inserts the filter into a coffee maker receptacle.

In U.S. Pat. No. 6,273,293 (Carlson) There is disclosed a combined filter housing, extractor and inserter using an adhesive tipped rod attached to a cover, to extract a single filter from nested filters and a plunger arranged around the adhesive tipped rod to detach the filter from the adhesive tipped rod. The user presses down on the cover using the thumb and four fingers. This attaches the filter to adhesive tipped rod. The user then lifts the cover up and inserts the filter into a coffee maker receptacle, the plunger is then depressed using the palm of the hand which detaches the filter.

While the device disclosed in the foregoing patent will extract and insert individual filters, it is difficult to manufacture and is difficult for a person with a small hand to operate if the cover has a large diameter.

As the outside diameter of the adhesive tipped rod used in this device is close to the inside diameter of the sliding plunger, using a putty type of adhesive on the tip, could cause the plunger to jam when the putty type adhesive spreads due to compression.

BRIEF SUMMARY OF THE INVENTION

It is the general object of the instant invention to provide a coffee filter extractor and inserter that overcomes the shortcomings of the prior art.

It is the further object of the instant invention to provide a device easy to manufacture and use.

These and other objects of the invention are achieved by providing a cover for a container of nested filters, having a tube extending downward from the center, through which an adhesive tipped plunger, capped with a knob, slides up and down. This configuration allows a person with a small hand to use the device with no problem. The lower end of the plunger has a smaller diameter than the body of the plunger which minimizes the probability of a putty type adhesive spreading and jamming between the plunger and the tube when it is compressed. The upper end of the plunger is also of a smaller diameter than the body of the plunger. This prevents the cover and tube from sliding off the end of the plunger when used with a collar at the upper end of the tube.

A replaceable tip, partially filled with an adhesive material may also be used with this invention.

This configuration is easy to manufacture as it consists of only three basic parts, that can be made using injection molding, and uses a very small amount readily available putty type adhesive.

DETAILED DESCRIPTION OF THE INVENTION

Figure 1:
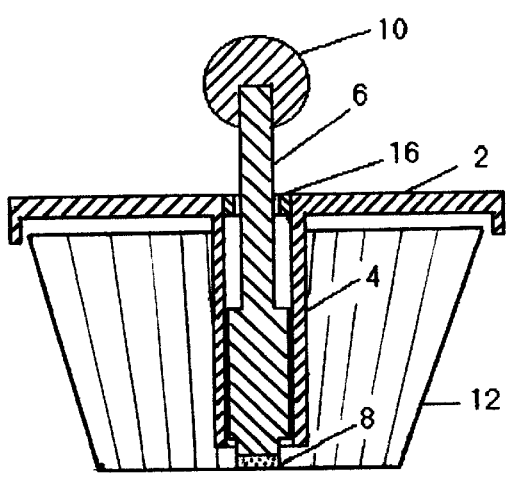
FIG. 1 is a cross-sectional view of the present invention showing a filter attached to the adhesive on the end of the plunger.

Referring to FIG. 1 there is shown a combination of the extracting and inserting mechanism.

There is a cover 2 having a tube 4 of extending below the center of cover 2 of sufficient length to seat a filter 12 into a coffee maker receptacle.

There is a plunger 6 that slides up and down within the inner wall of tube 4 having an adhesive 8 attached to the bottom end, and a knob 10 attached to the top end.

There is a collar 16 at the upper end of tube 4 to retain plunger 6.

There is a filter 12 shown attached to adhesive 8 on the bottom of plunger 6.

Figure 2:
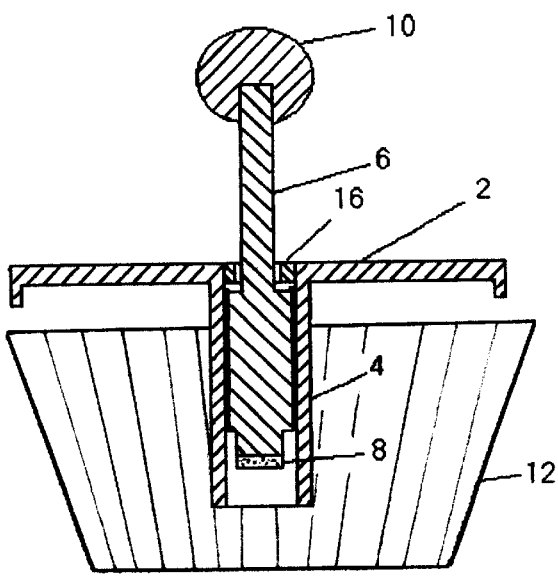
FIG. 2 is a cross-sectional view of the present invention showing the cover and tube pushed down detaching the filter.

Referring to FIG. 2 there is shown cover 2 depressed, sliding tube 4 down plunger 6, detaching filter 12, from adhesive 8, on the tip of plunger 6.

Figure 3:
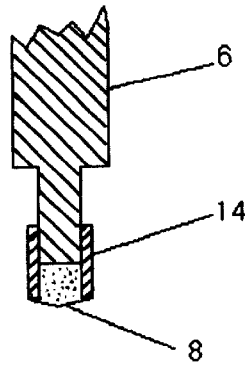
FIG. 3 is cross-sectional view of a replaceable adhesive tip on the end of the plunger with a supply of adhesive material inside the tip.

Referring to FIG. 3 there is shown a replaceable tip 14 with a supply of adhesive 8 attached to the bottom of plunger 6.

Cover 2 and tube 4 may be made of plastic using injection molding techniques or molded out of cardboard. Plunger 6 and knob 10 may be made of plastic using injection molding techniques, machined out of wood or plastic, or molded out of cardboard material. Adhesive 8 could be any suitable adhesive material.

Collar 16 may be made an integral part of the cover 2 and tube 4.

OPERATION OF INVENTION

Referring to FIG. 1 the user presses down on knob 10 which presses plunger 6, with adhesive 8 on the end against the top filter 12, in a nest of filters. The user then pulls up on knob 10 with the thumb and first two fingers, which lifts plunger 6 up, with filter 12 attached to adhesive 8. Filter 12 is then inserted in a coffee maker receptacle and the user pushes cover 2 down with the tip of the first finger of the hand, which slides tube 4 down plunger 6, detaching filter 12 from adhesive 8 and leaving it in the coffee maker receptacle.

To replace adhesive 8, the user removes the old adhesive and applies new adhesive or installs a new replaceable tip 14.

What I claim as my invention is:

1. A coffee filter extractor and inserter comprising;
   (a) a cover having a tube extending downward from the center, said tube being of sufficient length to insert a coffee filter into a coffee maker receptacle;

(b) a plunger extending above and below said cover, that slides up and down between an extended position and a retracted position within the tube, said plunger having a knob on the upper end;

(c) a replaceable adhesive material on the lower end of said plunger to engage the uppermost coffee filter of a plurality of coffee filters when said plunger is in said extend position;

(d) a means for preventing the cover and the tube from sliding off the plunger when the coffee filter is detached from the adhesive material;

(e) said tube with said plunger in said extended position having said coffee filter attached to said adhesive material being inserted into said coffee maker receptacle wherein said plunger is moved from said extended position to said retracted position to detach said coffee filter from said adhesive material so as to release said coffee filter within said coffee maker receptacle.

2. A coffee filter extractor said inserter of claim 1 wherein the plunger has a smaller diameter on the lower end that accommodates an adhesive material.

3. A coffee filter extractor and inserter of claim 1 wherein the means for preventing the cover and tube from sliding off the plunger, is a shoulder on the body of said plunger to engage a collar at the upper end of the tube.

4. A coffee filter extractor and inserter of claim 1 wherein there is a collar at the upper end of the tube that extends downward from the center of the cover.

5. A coffee filter extractor and inserter of claim 1 wherein the adhesive material is a replaceable cartridge containing a supply of adhesive material.

6. A coffee filter extractor and inserter of claim 1 wherein the cover, tube and collar are one unit.

* * * * *